(12) United States Patent
Fadavi-Ardekani et al.

(10) Patent No.: US 6,263,075 B1
(45) Date of Patent: Jul. 17, 2001

(54) INTERRUPT MECHANISM USING TDM SERIAL INTERFACE

(75) Inventors: Jalil Fadavi-Ardekani, Orefield; Donald Raymond Laturell, Upper Macungie, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 08/927,425

(22) Filed: Sep. 11, 1997

(51) Int. Cl.⁷ ...................................................... H04M 3/00
(52) U.S. Cl. ............................................. 379/399; 379/387
(58) Field of Search .................................... 375/216, 245, 375/246, 247, 248, 249, 250, 251–252, 253, 254; 455/574; 379/399, 413, 387; 341/61, 50, 126; 704/500, 503

(56) References Cited

U.S. PATENT DOCUMENTS 5,729,225 * 3/1998 Letzius ..................................... 341/61
6,016,550 * 1/2000 Kokkosoulis et al. ................. 713/400

OTHER PUBLICATIONS

Analog Devices et al., "Audio Codec '97; Component Specification; Revision 1.03; Sep. 15, 1996"; Sep. 15, 1997.

* cited by examiner

Primary Examiner—Wing F. Chan
(74) Attorney, Agent, or Firm—William H. Bollman

(57) ABSTRACT

An improvement to split-architecture audio codecs such as those defined by the Audio Codec '97 specification (AC '97) includes an interrupt mechanism which allows an event at an analog peripheral device such as an incoming call to be sensed by the AC analog sub-system and initiate a wake up procedure in the split-architecture audio codec system. The interrupt mechanism includes a masked interrupt register which is responsive to an interrupt signal from an audio source, such as a ring detect from an incoming telephone line. Either the AC controller sub-system or the peripheral analog device via the AC analog sub-system can initiate a wake up procedure. The AC controller sub-system includes a static divide by 256 counter responsive to a bit clock signal. The bit clock signal is sensed at the AC controller sub-system to determine an operating mode. Upon detection of at least 256 bit clock cycles after a predetermined minimum time for the AC analog sub-system to be in a halted or sleep mode, a wake up interrupt register is enabled in the AC controller sub-system. The interrupt sensor is opto-coupled to the AC analog sub-system, and the interrupt signal from the interrupt sensor is communicated to the AC controller sub-system via the five-wire TDM serial bus between the AC analog sub-system and the AC controller sub-system.

20 Claims, 4 Drawing Sheets

| WAKE UP MODE SEQUENCE | |
|---|---|
| 1ST | ANALOG |
| 2ND | CONTROLLER |
| 3RD | HOST |

FIG. 5A
PRIOR ART

| SLEEP MODE SEQUENCE | |
|---|---|
| 1ST | ANALOG |
| 2ND | CONTROLLER |
| 3RD | HOST |

FIG. 5B
PRIOR ART

| WAKE UP MODE SEQUENCE | |
|---|---|
| 1ST | HOST |
| 2ND | CONTROLLER |
| 3RD | ANALOG |

INTERRUPT MECHANISM USING TDM SERIAL INTERFACE

BACKGROUND OF THE INVENTION

1. Field of the Invention

This invention relates to an interrupt mechanism between two distinct sub-systems using a TDM serial interface. More particularly, it relates to a split-architecture audio codec system for use in a low power mode with an interrupting peripheral device such as a telephone over a telephone line.

2. Background of Related Art

Efficient and inexpensive digitization of telephone grade audio has been accomplished for many years by an integrated device known as a "codec." A codec (short for COder-DECoder) is an integrated circuit or other electronic device which combines the circuits needed to convert analog signals to and from Pulse Code Modulation (PCM) digital signals.

Early codecs converted analog signals at an 8 KHz rate into 8-bit PCM for use in telephony. More recently, the efficiency and low cost advantages of codecs have been expanded to convert analog signals at a 48 KHz sampling rate into 16-bit stereo (and even up to 20-bit stereo) for higher quality use beyond that required for telephony. With higher quality audio capability, today's codecs find practical application in consumer stereo equipment including CD players, modems, computers and digital speakers.

With the development of codecs for these more sophisticated purposes came the need to improve the analog signal-to-noise (S/N) ratio to at least 75 to 90 dB. One major step toward achieving this high S/N ratio was accomplished more recently by separating the conventional codec into two individual sub-systems and/or two separate integrated circuits (ICs): a controller sub-system handling primarily the digital interface to a host processor, and an analog sub-system handling primarily the interface to, mixing and conversion of analog signals. This split digital/analog architecture has been documented most recently as the "Audio Codec '97 Component Specification", Revision 1.03, Sep. 15, 1996 ("the AC '97 specification"). The AC '97 specification in its entirety is expressly incorporated herein by reference.

As shown in FIG. 3, currently known split-architecture audio codecs contemplate a host processor 400, an audio codec (AC) controller sub-system or IC 402, and an AC analog sub-system or IC 404. The AC analog sub-system 404 comprises some limited amount of digital circuits, but the significant portion of digital control and circuitry is intended to be implemented in the AC controller sub-system 402. The connection between the AC controller sub-system 402 and the AC analog sub-system 404 is currently defined as a five-wire time division multiplexed (TDM) interface controlled by an AC-link 406 in the AC analog sub-system 404. The AC controller sub-system 402 may be a stand alone device, or it may be a portion of a larger device such as a Peripheral Component Interconnect (PCI) interface device. PCI is a processor-independent, self-configuring local bus. Alternatively, the AC controller sub-system 402 may be a part of a central processing unit (CPU).

Because of the capabilities of the split digital/analog architecture (i.e., AC controller sub-system 402 and AC analog sub-system 404), the AC '97 specification includes a significant amount of flexibility intended to capture a large market by satisfying many consumer-related audio needs. For instance, the conventional AC analog sub-system 404 includes interface capability to accept input from multiple sources and to mix the analog signals from those multiple sources in digital form. Possible analog signal sources include a modem or telephone line.

FIG. 4 is a diagram showing relevant features of the conventional AC controller sub-system 402, AC-link 406 and AC analog sub-system 404.

Many consumer devices are powered by battery and enjoy a longer battery life if power can be conserved. To this end, the conventionally known AC controller sub-system 402 and AC analog sub-system 404 include power management support wherein power consumption is greatly reduced by entering a low power mode, sometimes referred to as a halted or sleep mode. In conventional devices the AC controller sub-system 402 places the AC link portion 406 of the AC analog sub-system 404 in a low power mode wherein all clock, sync and data signals are halted by enabling a powerdown register in the command decode section 500 of the AC analog sub-system 404, as shown in FIG. 4.

Unfortunately, the currently known AC controller sub-system 402 and AC analog sub-system 404 provide only two methods for bringing the AC-link 406 and AC analog sub-system 404 out of a low power, halted mode. Regardless of the method, it is the AC controller sub-system 402 that initiates and performs the wake up task.

An external crystal 506 and internal clock circuit 504 provide a 12.288 MHz bit clock signal as one input to AND function 508. A low power enable signal is passed from the command and data portion 520 of the AC controller sub-system 402, over the TDM serial line 550, to set a register in the command decode portion 500 of AC analog sub-system 404. The low power enable signal 560 provides a second input to AND function 508 such that when enabled by the low power enable signal 560, a bit clock signal 554 is provided by the AC analog sub-system 404 to the C controller sub-system 402. When disabled by the low power enable signal 560, the bit clock signal 554 is prevented from clocking the AC controller sub-system 402.

A divide by 256 counter or equivalent function 522 in the AC controller sub-system 402 provides a frame signal after 256 cycles of the bit clock signal 554 to set a frame interrupt register 524.

All communication between the AC controller sub-system 402 and the AC analog sub-system 404 are passed over the two-way TDM bus 550–558, including enable signals to the AC analog sub-system 404. For instance, various registers in the AC analog sub-system 404 may be set by or through the AC controller sub-system 402 to place various components of the AC analog sub-system 404 in a low power, halted or sleep mode. Table I shows the conventional bit assignment of the conventional powerdown register of a split digital/analog architecture audio codec device defined by the AC '97 specification.

TABLE I

| Powerdown Register | |
|---|---|
| BIT | FUNCTION |
| PR0 | PCM in ADC's & Input Mux Powerdown |
| PR1 | PCM out DACs Powerdown |
| PR2 | Analog Mixer Powerdown (Vref still on) |
| PR3 | Analog Mixer Powerdown (Vref off) |
| PR4 | Digital Interface (AC-link) powerdown |
| PR5 | Internal clock disable |

TABLE I-continued

Powerdown Register

| BIT | FUNCTION |
|---|---|
| PR6 | HP amp powerdown |
| PR7 | Modem ADC/DAC off (if supported) |

Bit signals PR0 to PR3 and PR5 to PR7 place various components of the AC analog sub-system 404 in the low power, halted or sleep mode. Sequential writes to the powerdown register are performed during normal operation to power down the AC analog sub-system 404 one or more functional blocks at a time. After the desired functional blocks on the AC analog sub-system 404 capable of powerdown are powered down, a final write to bit PR4 places the AC analog sub-system's digital interface, the AC-link 406, in a low-power, halted or sleep mode.

The powerdown register in the command decode section 500 of the AC analog sub-system 404 brings and holds both the bit clock signal 554 and the serial TDM data input 552 provided to the command and data 520 of the AC controller sub-system 402 at a logic low level. The AC controller sub-system 402 thereafter drives the sync line 556 and the serial TDM data out line 550 low after programming the AC-link 406 to the low power, halted, sleep mode.

Once the AC-link 406 has been instructed to halt the bit clock signal 554, i.e., to enter a low power mode, only a special wake up protocol can be used to bring the AC-link 406 back to the active mode since normal audio output and input frames cannot be communicated in the absence of the bit clock signal 554. Once powered down, reactivation of the AC-link 406 is asserted by activation of the sync signal 556 after a minimum of 4 audio frame times following the frame in which the power down was triggered. There are only two conventional methods to bring the AC-link 406 out of the low power, halted, sleep mode: a cold reset, and a warm reset. A cold reset is achieved from the AC controller sub-system 402 by asserting the reset signal 558, which initializes all AC analog sub-system 404 control registers to their default power on reset values. In a warm reset, the AC controller sub-system 402 sends a sync signal 556 to re-activate the AC-link 406 without altering the current AC analog sub-system 404 control register values. The sync signal 556 must be high for a minimum of 0 microsecond in the absence of the bit clock signal 554 to perform the warm reset. To preclude the false detection of a new audio frame and thus a false awakening of the AC analog sub-system 404, the AC-link 406 does not respond to activity on the bit clock signal 554 until the sync signal 556 has been sampled low again.

As shown in FIG. 5A, conventional split architecture audio codecs initially halt operation of the AC analog sub-system 404, then halt operation of the AC controller sub-system 402 as necessary or desired, and ultimately can place the host processor 400 in a low power, halted or sleep mode if desired for maximum power savings. The sequence of waking up the conventional split-architecture audio codec system is typically the opposite of that shown in FIG. 5A, as shown in FIG. 5B, i.e., first the host processor 400 and/or the AC controller sub-system 402 must be operating normally, and lastly the AC analog sub-system 404 is brought to an active mode.

Accordingly, only the AC controller sub-system 402 can wake up the AC analog sub-system 404 once the AC analog sub-system 404 enters the low power mode. Events originated at a peripheral device interfaced only to the AC analog sub-system 404, i.e., analog signal source devices, are not capable of waking up currently known AC controller sub-systems 402. Thus, currently known split-architecture audio codecs cannot allow the AC analog sub-system 404 to enter a low power mode if the system is designed to respond to events originating at a peripheral device. For instance, the conventional AC analog sub-system 404 is not capable of waking up from a low power, halted mode upon detection of an incoming call from a telephone line.

SUMMARY OF THE INVENTION

The present invention provides an important improvement to the currently known split architecture audio codec solution. In particular, the present invention provides a split-architecture audio codec including both a controller sub-system and an analog sub-system each having a low power mode. The analog sub-system includes an interrupt signal indicating the occurrence of an event at an analog source device which interfaces to the analog sub-system. A wake up procedure is initiated in the analog sub-system and/or in the controller sub-system based on the interrupt signal from the peripheral device.

The present invention further provides a method of operating, in a low power mode, a split-architecture audio codec system including an analog sub-system and a controller sub-system. In operation, at least one functional block of the analog sub-system is placed in a low power mode, and a signal is provided from a peripheral device directly to the analog sub-system to initiate a wake up procedure in the analog sub-system and/or in the controller sub-system.

BRIEF DESCRIPTION OF THE DRAWINGS

Features and advantages of the present invention will become apparent to those skilled in the art from the following description with reference to the drawings, in which:

FIG. 5A shows the conventional order of the AC analog sub-system, AC controller sub-system, and host components entering a sleep mode.

FIG. 5B shows the conventional wake-up order of the host, AC controller sub-system and AC analog sub-system components.

DETAILED DESCRIPTION OF ILLUSTRATIVE EMBODIMENTS

Figure 1:
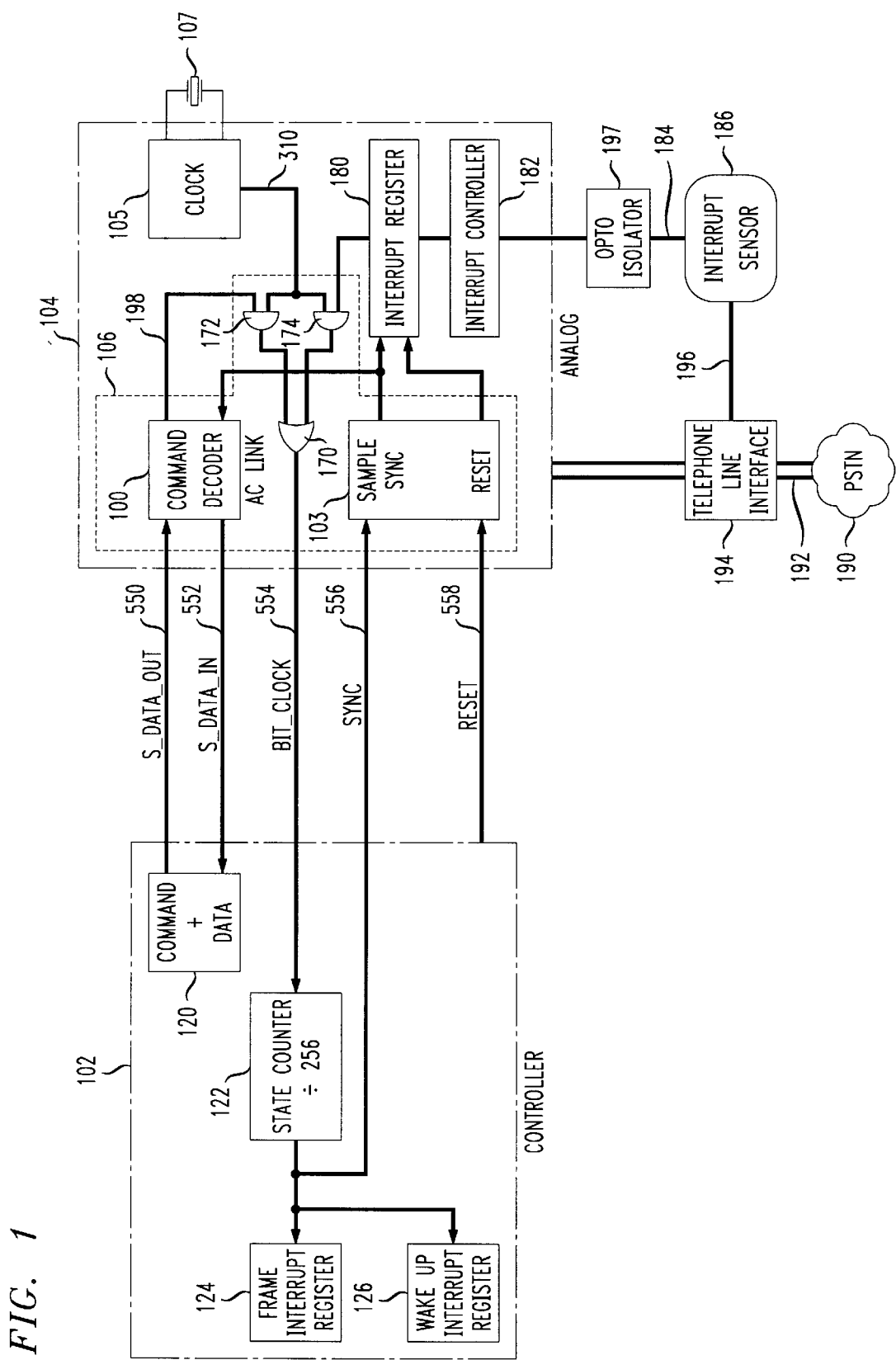
FIG. 1 shows an embodiment of a split-architecture audio codec according to the present invention.

FIG. 1 shows pertinent features of a split-architecture audio codec system according to the present invention. Those features not shown are essentially as described in the Audio Codec '97 specification, which is expressly incorporated herein by reference.

The first embodiment of the present invention relates to a split-architecture audio codec interfacing a telephone line. The split-architecture audio codec system according to the present invention includes an AC controller sub-system 102 and an AC analog sub-system 104 which are each modified from that described in the AC '97 specification as will be described herein.

For power management purposes, it is at times desirable to place the AC analog sub-system 104 and the AC controller sub-system 102 into a low power mode, sometimes referred to as a halted or sleep mode, while awaiting an incoming call from the telephone line. Conventional split-architecture audio codecs will not wake up upon an incoming call over a telephone line input to the AC analog sub-system 104. The present invention provides a split-architecture audio codec system which allows a halted or sleeping AC analog sub-system 104 in a low power mode to wake up when an incoming call is detected even before the AC controller sub-system 102 wakes up. For instance, as a result of the present invention a laptop or handheld computer with a telephone line input to a modem may place its AC analog sub-system 104 in a low power, halted, sleep mode until an incoming facsimile is received. Then, when the incoming facsimile signal is received, the AC analog sub-system 104 initiates a wake-up process in the split-architecture audio codec system using the five-wire TDM serial bus to communicate the wake up condition to the AC controller sub-system 102.

In FIG. 1, a split-architecture audio codec system according to the present invention is implemented and interfaced to a telephone line interface 194 and a telephone line 192 connected to the public switched telephone network (PSTN) 190. An interrupt sensor 186 outputs an interrupt sensor signal 184 to the AC analog sub-system 104 via an opto-isolator 197 to provide electrical isolation. The interrupt sensor 186 in the exemplary embodiment is triggered by a ring detect signal 196 from the telephone line interface 194. Preferably, such an interrupt sensor 186 is opto-isolated from the AC analog sub-system 104 to minimize electrical noise into the AC analog sub-system 104. However, in less sensitive applications, isolation need not be provided. For instance, some interrupt sensors may not require electrical isolation such as an off-hook sense for a local telephone where no isolation is required. Virtually any device which senses the occurrence of any desired event relating to an analog signal device interfaced to or contained within the AC analog sub-system 104 may be interfaced to the AC analog sub-system 104, either directly or with isolation, optical or otherwise. Of course, the interrupt sensor 186 may be placed within the AC analog sub-system 104 itself with suitable electrical isolation if necessary or required.

The split-architecture audio codec according to the present invention is capable of waking up from a low power, halted or sleep mode in the conventional sense, i.e., at the request of the AC controller sub-system 102. Bit signal PR4 as shown in Table I is enabled in the command and data portion 120 of the AC controller 102, and passed to the command decoder 100 of the AC-link 106 in the AC analog sub-system 104 over the five-wire time division multiplexed (TDM) serial out data bus 550. An unenabled bit signal PR4 corresponds to an enable, wake up, activate or stay activated signal 198 from the command decoder 100. This enable signal 198 gates the system clock signal in a first AND functional block 172, the output of which is ORed by OR functional block 170 and ultimately output as a bit clock signal 554 to the AC controller sub-system 102. The particular use of AND, OR or other logic gates in FIG. 1 is somewhat arbitrary as long as the logical result is the same or equivalent.

If bit signal PR4 is not enabled (or even if bit signal PR4 is enabled), a second enable signal has the capability to allow the system clock signal 310 to pass through the OR functional block 170 upon the detection of an interrupt signal from the interrupt sensor 186 input to the AC analog sub-system 104. This second enable signal corresponds to a first input to a second AND functional block 174, with the 12.288 MHz system clock signal 310 from clock 105 being the second input to the second AND functional block 174. Thus, the second enable signal gates the system clock signal 310 through the second AND functional block 174, which is ORed in OR functional block 170. The speed of the system clock signal 310 corresponds to the bit rate and is based on the value of external crystal 107 and the clock 105.

Accordingly, both the AC controller sub-system 102 and the interrupt sensor 186 have independent capability to initiate activation of or wake up the AC analog sub-system 104.

After the AC analog sub-system 104 has been halted or placed in the low power mode for a predetermined period of time, e.g., for 4 frames according to the current audio codec specification, i.e., AC '97 specification, the AC controller sub-system 102 detects that the AC analog sub-system 104 is initiating a wake up procedure by sensing the bit clock line 554. Upon detection of renewed activity on the bit clock line 554, a wake up interrupt register 126 is set in the AC controller sub-system 102.

A static or non-volatile divide by 256 counter which retains its count when the AC controller sub-system 102 is in the low power mode is provided to prevent an inadvertent wake up request from the AC analog sub-system 104. In normal operation, the divide by 256 clock 122 counts bit cycles of the bit clock signal 554 to periodically trigger the frame interrupt register 124. With this preventative measure, the bit clock signal 554 must present at least 256 clock cycles to the AC controller sub-system 102 before the AC controller sub-system 102 senses that the AC analog sub-system 104 is initiating a wake up procedure. Otherwise, as the AC controller sub-system 102 periodically checks the status of its registers and other housekeeping chores while in the low power, halted or sleep mode, it will clear any inadvertent counts in the static divide by 256 clock 122. Counts in the divide by 256 clock 122 are considered inadvertent if the count is less than 255 when the AC controller sub-system 102 periodically checks the state of the divide by 256 clock 122 while in the low power, halted mode.

Figures 2, 3:
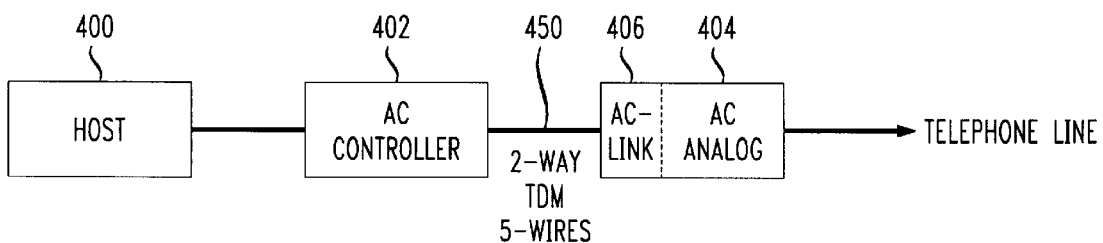
FIG. 2 shows a possible wake-up order of the AC analog sub-system, AC controller sub-system, and host components in a sequence originating from an interrupt event from a telephone line and first waking up the AC analog sub-system before the AC controller sub-system according to the present invention.
FIG. 3 is a conventional block diagram showing basic connectivity between a host processor, an AC controller sub-system, and an AC analog sub-system.
Figure 4:
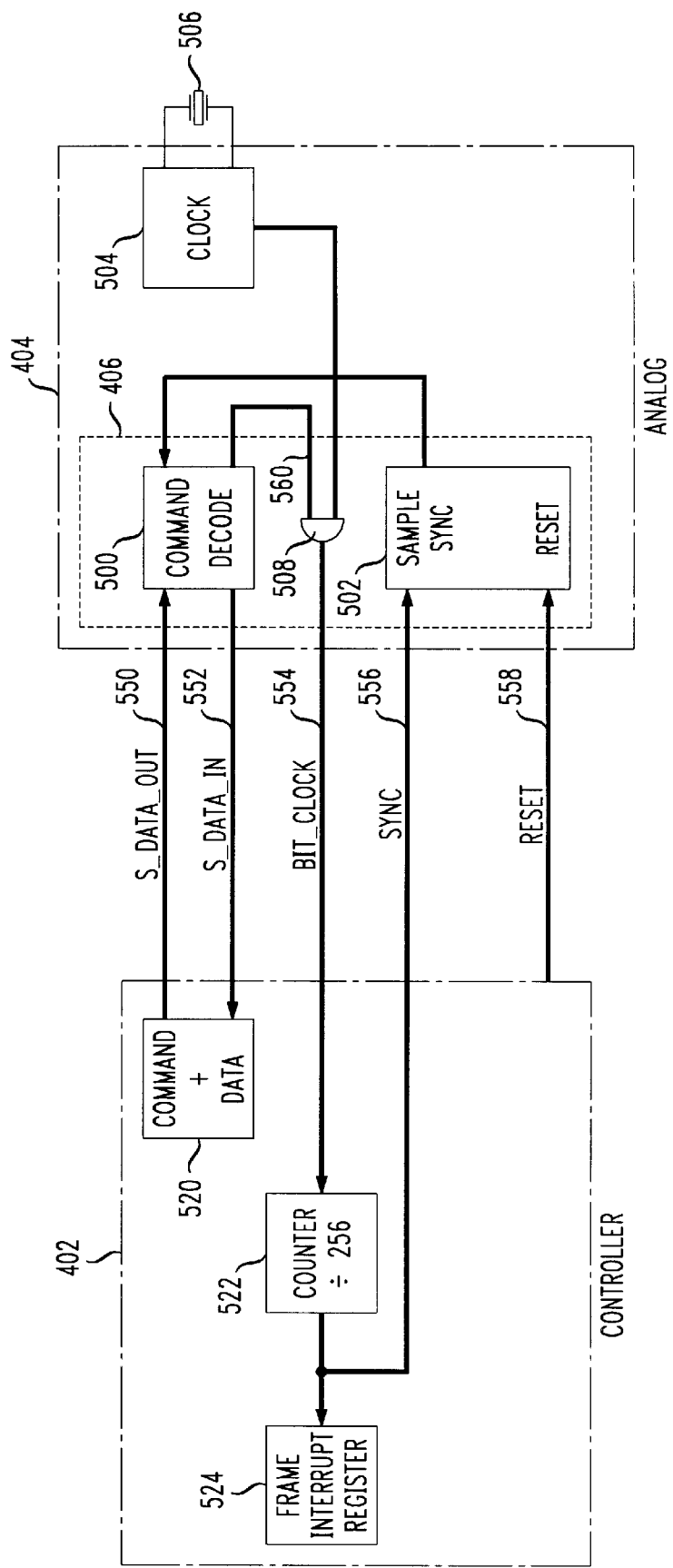
FIG. 4 is a more detailed diagram of portions of the conventional AC controller sub-system and AC analog sub-system.

When the host processor, the AC controller sub-system 102 and the AC analog sub-system 104 are in a low power, halted or sleep mode, FIG. 2 shows a possible sequence of waking up the split-architecture audio codec system according to the present invention. When both the AC controller sub-system 102 and the AC analog sub-system 104 are both in a low power, halted or sleep mode, the AC analog sub-system 104 may be the first to sense an interrupt signal such as from an incoming call. The AC analog sub-system 104 may then alert the AC controller sub-system 102 to the awakening status of the AC analog sub-system 104 by activating the five wire TDM bus, in particular the BIT_CLOCK signal 554, and thus initiate power up procedures in the AC controller sub-system 102. The AC controller sub-system 102 may in turn complete any additionally necessary power up procedures in the AC analog sub-system 104.

While the invention has been described with reference to the exemplary preferred embodiments thereof, those skilled in the art will be able to make various modifications to the described embodiments of the invention without departing from the true spirit and scope of the invention.

We claim:

1. A split-architecture audio codec comprising:

a controller sub-system having a low power mode; and an analog sub-system having a low power mode, said analog sub-system including a signal indicating an occurrence of an event at an analog source device interfacing to said analog sub-system, said signal in said analog sub-system being capable of initiating a wake up procedure in said analog sub-system.

2. The split-architecture audio codec according to claim 1, wherein said analog sub-system further comprises:

an interrupt register containing said signal.

3. The split-architecture audio codec according to claim 2, wherein said analog sub-system further comprises:

an interrupt controller for masking said signal.

4. The split-architecture audio codec according to claim 1, wherein said analog sub-system further comprises:

an AC link; and an OR function which initiates a wake up procedure in said AC link in response to either said bit signal or a wake up signal from said controller sub-system.

5. The split-architecture audio codec according to claim 1, wherein:

said split-architecture audio codec is capable of maintaining at least a 75 decibel signal-to-noise ratio with respect to an analog signal from said analog source device.

6. The split-architecture audio codec according to claim 1, further including:

an interrupt sensor electrically isolated from said analog sub-system.

7. The split-architecture audio codec according to claim 6, further comprising:

an opto-coupler to electrically isolate said interrupt sensor from said analog sub-system.

8. A method of operating, in a low power mode, a split-architecture audio codec system including an analog sub-system and a controller sub-system, said method comprising:

placing at least one functional block in said analog sub-system in said low power mode;

placing at least one functional block in said controller sub-system in said low power mode;

providing a signal from a peripheral device to said analog sub-system; and providing said signal from said peripheral device and said analog sub-system to said controller sub-system to initiate a wake up procedure in said controller sub-system.

9. A split-architecture audio codec comprising:

a controller sub-system having a low power mode; and an analog sub-system having a low power mode, said analog sub-system including a signal indicating an occurrence of an event at an analog source device interfacing to said analog sub-system, said signal in said analog sub-system being capable of initiating a wake up procedure in said controller sub-system.

10. The split-architecture audio codec according to claim 9, wherein:

said analog sub-system initiates said wake up procedure in said controller sub-system over a time division multiplexed serial bus between said analog sub-system and said controller sub-system.

11. The split-architecture audio codec according to claim 10, wherein:

said time division multiplexed serial bus includes a bit clock line.

12. The split-architecture audio codec according to claim 11, wherein:

said analog sub-system initiates said wake up procedure in said controller sub-system by activating said bit clock line.

13. A method of operating, in a low power mode, a split-architecture audio codec system including an analog sub-system and a controller sub-system, said method comprising:

placing at least one functional block in said analog sub-system in said low power mode; and providing a signal peripheral to said split-architecture audio codec system directly to said analog sub-system to initiate a wake up procedure in said analog sub-system.

14. The method according to claim 13, further comprising, before said step of providing said signal from said peripheral device:

placing at least one functional block in said controller sub-system in said low power mode.

15. In an analog sub-system portion of a split-architecture audio codec, the improvement comprising:

a bit clock in said analog sub-system which is activated when enabled from a controller sub-system portion of said split-architecture audio codec;

an interrupt register in said analog sub-system portion containing a signal indicating an interrupt event originating at an analog source device; and an interrupt controller capable of masking said signal;

said analog sub-system portion being capable of operating in an active mode wherein an output from said bit clock is cycled, and in a halted, low power mode wherein said output from said bit clock is held at a constant level; and said analog sub-system portion being placed in said active mode in response to a detection of said signal.

16. In the analog sub-system portion of the split-architecture audio codec according to claim 15, the improvement further comprising:

an OR functional block between said signal and an activation signal from said controller sub-system portion, wherein said bit clock is cycled upon activation by said controller sub-system portion.

17. In the analog sub-system portion of the split-architecture audio codec according to claim 15, wherein:

said analog sub-system portion is capable of maintaining at least a 75 decibel signal-to-noise ratio with respect to an analog device interfacing to said analog sub-system portion.

18. In the analog sub-system portion of the split-architecture audio codec according to claim 15, the improvement further comprising:

an interrupt sensor.

19. In the analog sub-system portion of the split-architecture audio codec according to claim 18, wherein:

said interrupt sensor is a ring detect from a telephone line.

20. In the analog sub-system portion of the split-architecture audio codec according to claim 18, wherein:

said interrupt sensor is external to said analog sub-system portion.

* * * * *